US008437709B2

(12) United States Patent
Kanazawa

(10) Patent No.: US 8,437,709 B2
(45) Date of Patent: May 7, 2013

(54) WIRELESS APPARATUS

(75) Inventor: Masaru Kanazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 558 days.

(21) Appl. No.: 12/488,141

(22) Filed: Jun. 19, 2009

(65) Prior Publication Data

US 2010/0015931 A1 Jan. 21, 2010

(30) Foreign Application Priority Data

Jul. 16, 2008 (JP) ................................. 2008-184744

(51) Int. Cl.
*H04B 1/38* (2006.01)

(52) U.S. Cl.
USPC .......................................... 455/90.3; 343/702

(58) Field of Classification Search ................. 455/90.3, 455/566; 343/702; 701/41
See application file for complete search history.

(56) References Cited

U.S. PATENT DOCUMENTS

| | | | | |
|---|---|---|---|---|
| 7,420,513 | B2 | 9/2008 | Tsutsumi et al. | |
| 2006/0290575 | A1 | 12/2006 | Pelzer | |
| 2007/0285334 | A1 | 12/2007 | Tsutsumi et al. | |
| 2008/0150812 | A1 * | 6/2008 | Kanazawa et al. | 343/702 |
| 2010/0282852 | A1 * | 11/2010 | Koenck et al. | 235/472.01 |
| 2011/0279310 | A1 | 11/2011 | Shibohta | |

FOREIGN PATENT DOCUMENTS

| | | | |
|---|---|---|---|
| JP | 2006-25223 | A | 1/2006 |
| JP | 2006-526322 | A | 11/2006 |
| JP | 2007-306347 | A | 11/2007 |
| JP | 2007-335989 | A | 12/2007 |
| WO | WO-2009-035039 | A1 | 3/2009 |

OTHER PUBLICATIONS

Japanese Office Action mailed on May 29, 2012 for corresponding Japanese Application No. 2008-184744, with Partial English-language Translation.

* cited by examiner

*Primary Examiner* — Phuoc Doan
(74) *Attorney, Agent, or Firm* — Fujitsu Patent Center

(57) ABSTRACT

A wireless apparatus includes a display, a display case encasing the display, a body supporting the display case capable of rolling sideways the display, a first antenna element arranged in the display case, a second antenna element arranged in crossed direction of the first antenna element direction in the display case, and an antenna switch configured to switch between the first antenna and the second antenna in accordance with rolling positions of the display case with the body.

7 Claims, 7 Drawing Sheets

WIRELESS APPARATUS

CROSS-REFERENCE TO RELATED APPLICATION

This application is based upon and claims the benefit of priority of the prior Japanese Patent Application No. 2008-184744, filed on Jul. 16, 2008, the entire contents of which are incorporated herein by reference.

FIELD

The present invention relates to a wireless apparatus having a display.

BACKGROUND

A wireless apparatus for example typified by a mobile phone or the like has a display with a screen in order to display an input state of a phone number. This display can also perform a display of TV broadcast, displays of web content obtained by packet data communications, and mail, etc. In order to improve the usability of TV broadcast, mail, the Internet, there are mobile wireless apparatuses that roll the display sideways (rotate, i.e., swing the display by 90 degrees), to put the screen from a lengthwise position into a sideways position.

On the other hand, for the mobile wireless apparatus, as set forth in Japanese Laid-open Patent Publication No. 2006-25223, there is a technique for implementing polarization diversity by installing a plurality of antennas and switching between the antennas.

Conventionally, regarding a mobile wireless apparatus holding the screen so as to be capable of rotate from a lengthwise position to a sideways position, how antennas are to be arranged to implement polarization diversity has not been studied.

SUMMARY

According to an aspect of the invention, a wireless apparatus includes a display, a display case encasing the display, a body supporting the display case capable of rolling sideways the display, a first antenna element arranged in the display case, a second antenna element arranged in crossed direction of the first antenna element direction in the display case, and an antenna switch configured to switch between the first antenna and the second antenna in accordance with rolling positions of the display case with the body.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be explained with reference to the drawings.

Figures 1A, 1B:
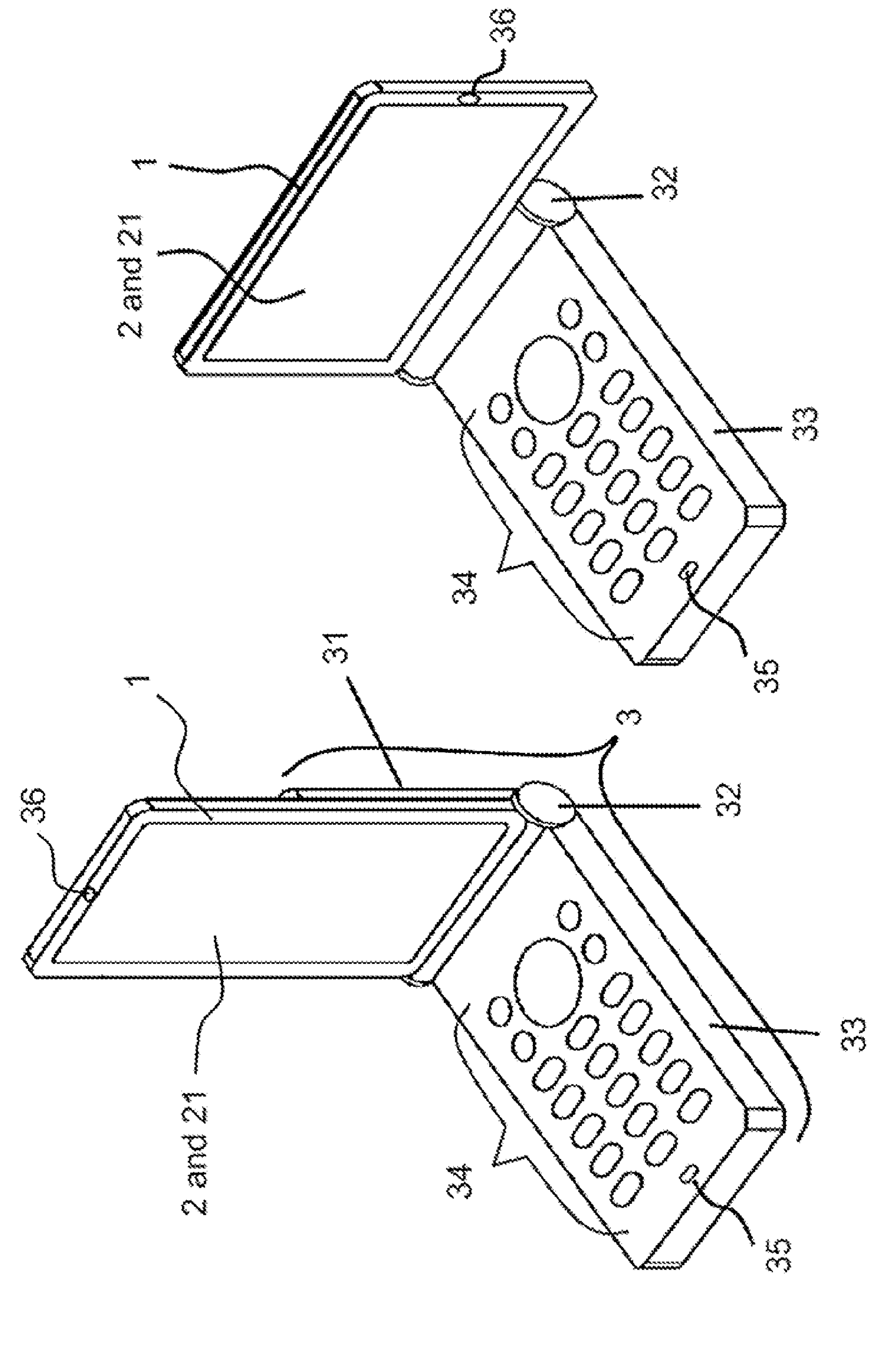
FIGS. 1A and 1B are a diagram illustrating an example of a wireless apparatus having a display.

FIGS. 1A and 1B illustrate an example of mobile wireless apparatus having a display, according to the embodiment. FIG. 1A illustrates the case wherein the display of the mobile wireless apparatus is located at a regular position, and FIG. 1B illustrates a state wherein the display has rolled sideways or rotated by 90 degrees in the right direction. The mobile wireless apparatus illustrated in FIGS. 1A and 1B includes a display 2, a display case 1, and a body 3.

The display case 1 encases a display 2. The display 2 has a screen 21. The screen 21 may perform a display of TV broadcast, and displays of web content obtained by packet data communications, and mail, etc. In FIGS. 1A and 1B, the display case 1 has a speaker 36 provided at an upper portion of the display case 1. As illustrated in FIG. 1B, when the display 2 rolls sideways on the body 3, it may switch display content of its screen from a lengthwise mode to a sideways mode.

The body 3 supposes the display case 1 so that the screen 21 of the display 2 may roll sideways. The body 3 includes a first case 33, a second case 31, and a hinge 32. The second case 31 is rotatably connected to the first case 33 by the hinge 32. The second case 31 encases the display case 1 so as to be capable of rolling sideways. The first case 33 includes key pads 34 for performing input of phone numbers and/or character input, and a microphone 35 for phone call.

In this embodiment, inside the rotatable display case 1 of the mobile wireless apparatus has antenna elements for polarization diversity. Here, there are provided two antenna elements at a minimum in the display case 1. The relationship between the antenna elements is such that one antenna element is located at a position to may allow receiving a orthogonal polarized wave to that of the other antenna element. For example, the antenna elements are in orthogonal positional relationships with respect to each other.

Figure 2B:
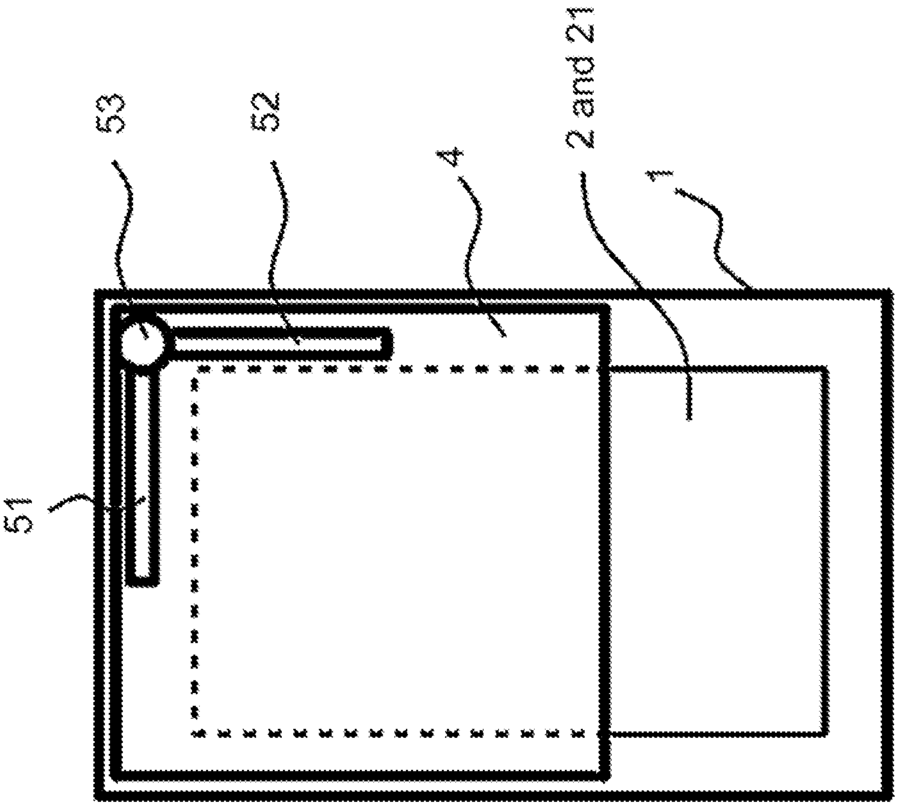
FIGS. 2A and 2B are a diagram illustrating the structure of a display case 1 with antennas.
Figure 2A:
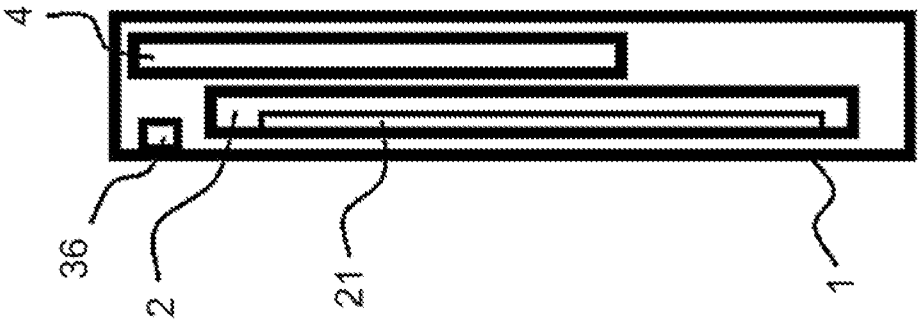

FIGS. 2A and 2B illustrate the structure of the display case 1 with antenna elements arranged thereon. FIG. 2A is a sectional view of a side surface of the display case 1, and FIG. 2B illustrates a state of the display case 1 when viewed from the back surface side thereof.

The display case 1 encases the display 2 so as to expose the screen from one side of the face of the display case 1. On the face (front surface side) on which the screen 21 is exposed, the speaker 36 is provided at an upper portion of the screen 21. Furthermore, the display case 1 encases a substrate 4 on the face side (back surface side) opposed to the screen 21 of the display 2.

The substrate 4 includes a first antenna element 51, a second antenna element 52 and a power feeding portion, the antenna elements 51 and 52 being formed by wiring pattern. In this case, for example, when the first antenna element 51 most strongly receives a radio wave of a first polarized wave (e.g. longitudinal polarized wave), to allow the second antenna element 52 to most strongly receive a radio wave of a second polarized wave (e.g. longitudinal polarized wave) orthogonal to the first polarized wave.

The first antenna element 51 and the second antenna element 52 each have a length of λ/4 with respect to a used frequency of a radio wave. The substrate also includes a ground pattern 45 besides the first antenna element 51, the second antenna element 52 and the power feeding portion 53.

Figure 3:
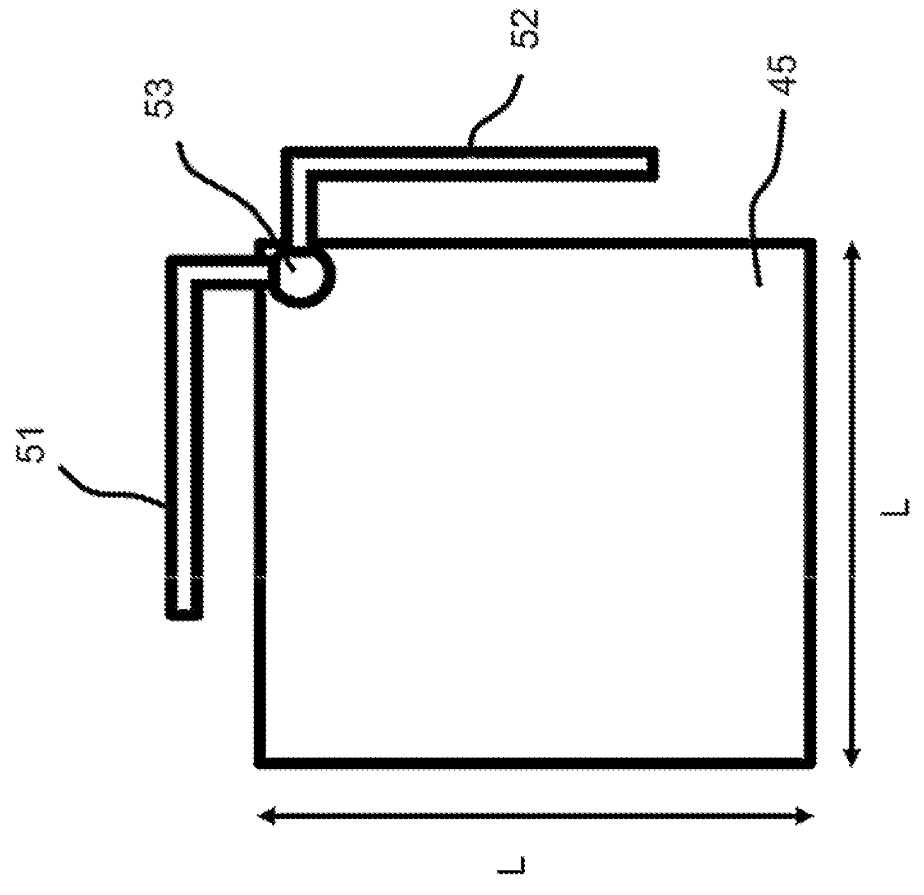
FIG. 3 is a diagram illustrating the relationships among a ground pattern and antenna elements.

FIG. 3 illustrates the relationships among the ground pattern 45, the first antenna element 51, and the second antenna element 52. The first antenna element 51 and the second antenna element 52 are each a λ/4 type antenna element bent into an L-shape. The ground pattern 45 has a square shape of which four sides have equal lengths L. One side of the ground pattern 45 has a length of λ/4 with respect to a used frequency of a radio wave. With this arrangement, a combination of the first antenna element 51 and the ground pattern 45, and a combination of the second antenna element 52 and the ground pattern 45 each operates as an antenna having an electric length of λ/2.

An electric current flowing in the ground pattern 45 is characterized by flowing in the direction along a length near λ/4 of a used frequency. Accordingly, in this embodiment, by forming the ground pattern 45 into a square shape, the direction of the electric current flowing in the ground pattern 45 may be switched when the antenna element is switched from the first antenna element 51 to the second antenna element 52. On the other hand, if the ground pattern 45 is formed into a rectangular shape, an electric current flows in the longitudinal direction of the ground pattern 45 even if the antenna element is switched, so that a received polarized wave may not being switched even though the antenna element is switched.

As an example, the first antenna element 51 is arranged along a first side of the ground pattern 45. The second antenna element 52 is arranged along a side of the ground pattern 45, the side being perpendicular to the first antenna element 51. In this way, arranging the second antenna element 52 perpendicularly to the first antenna element 51 allows the second antenna element 52 to most strongly receive a polarized wave perpendicular to that of the first antenna element 51. In FIG. 3, the power feeding portion 53 is shared between the first antenna element 51 and the second antenna element 52.

Figure 4:
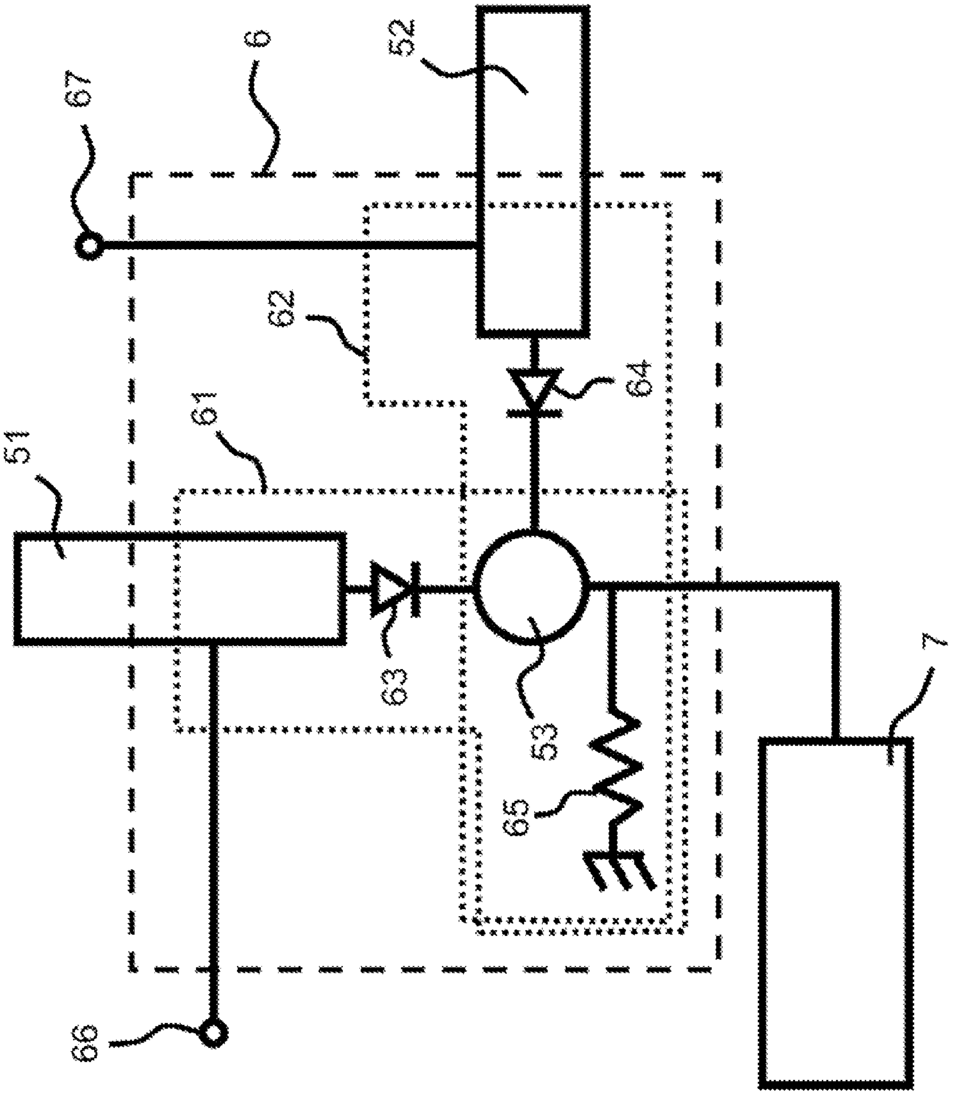
FIG. 4 is a diagram illustrating structures surrounding a power display portion 53.

Configurations surrounding the power feeding portion 53 are described with reference to FIG. 4. The power feeding portion 53 is connected to the first antenna element 51 via a first diode 63, and connected to the second antenna element 52 via a second diode 64. Furthermore, the power feeding portion 53 is connected to a wireless processing portion 7 and a resistor 65 that is grounded. The first antenna element 51 is connected to a first control voltage terminal 66. The second antenna element 52 is connected to a second control voltage terminal 67.

In the present embodiment, an antenna switching portion 6 is formed by the first control voltage terminal 66, the second control voltage terminal 67, the resistor 65, the first diode 63, the second diode 64, and the power feeding portion 53. The antenna switching portion 6 includes a first switch 61 and a second switch 62. The first switch 61 is formed by the first control voltage terminal 66, the resistor 65, the first diode 63 and the power feeding portion 53; and a second switch 62 that is formed by the second control voltage terminal 67, the resistor 65, the second diode 64, and the power feeding portion 53.

In this embodiment, when the first antenna element 51 is used, the first switch 61 is turned on. Specifically, in the first switch 61, the first control voltage terminal 66 is applied a reverse bias voltage exceeding an avalanche point. Therefore, the first diode 63 is into a conduction state. In the same way, in the second switch 62, the second control voltage terminal 67 is applied a reverse bias voltage exceeding an avalanche point. Therefore, the second diode 64 is into a conduction state. That is to say, the antenna switching portion 6 may select the first antenna element 51 or the second antenna element 52 so as to apply a bias voltage to either the first control voltage terminal 66 of the first switch 61 or the second control voltage terminal 67 of the second switch 62.

Figure 5A:
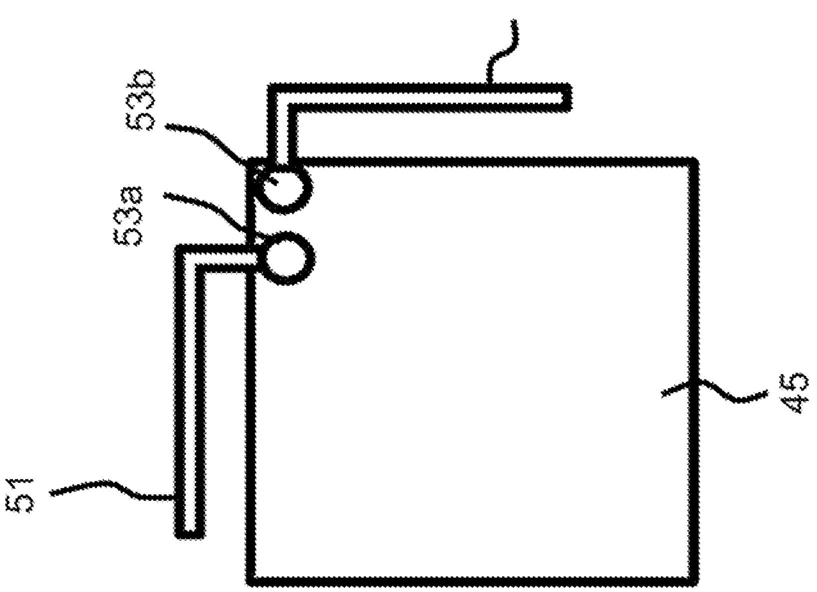
FIGS. 5A and 5B are a diagram illustrating modifications of the embodiment illustrated in FIG. 3.
Figure 5B:
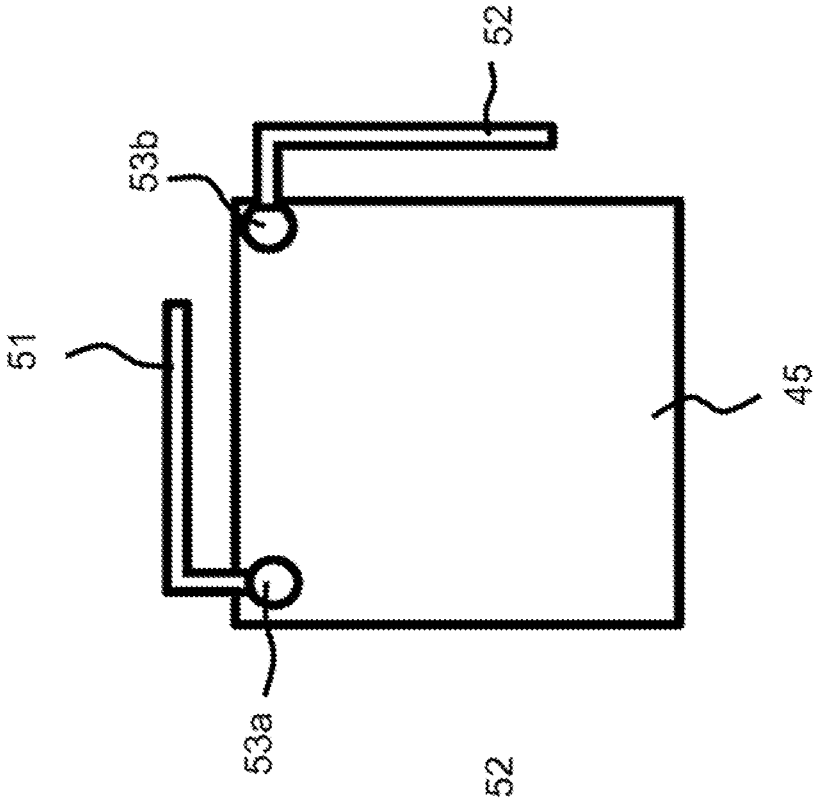

FIGS. 5A and 5B illustrate modifications of the embodiment illustrated in FIG. 3. In FIGS. 5A and 5B, antenna element 51 connects with a power feeding portion 53*a* and antenna element 52 a power feeding portion 53*b*. The power feeding portion 53*a* is arranged in correspondence with the first antenna element 51. The power feeding portion 53*b* is arranged in correspondence with the second antenna element 52. While not illustrated here, the power feeding portion 53*a* has the first switch 61 similar to that illustrated in FIG. 4, and the power feeding portion 53*b* has the second switch 62 similar to that illustrated in FIG. 4. Installing two power feeding portions enables the first antenna element 51 and the second antenna element 52 to be located at optional positions with respect to the ground pattern 45.

Figure 6:
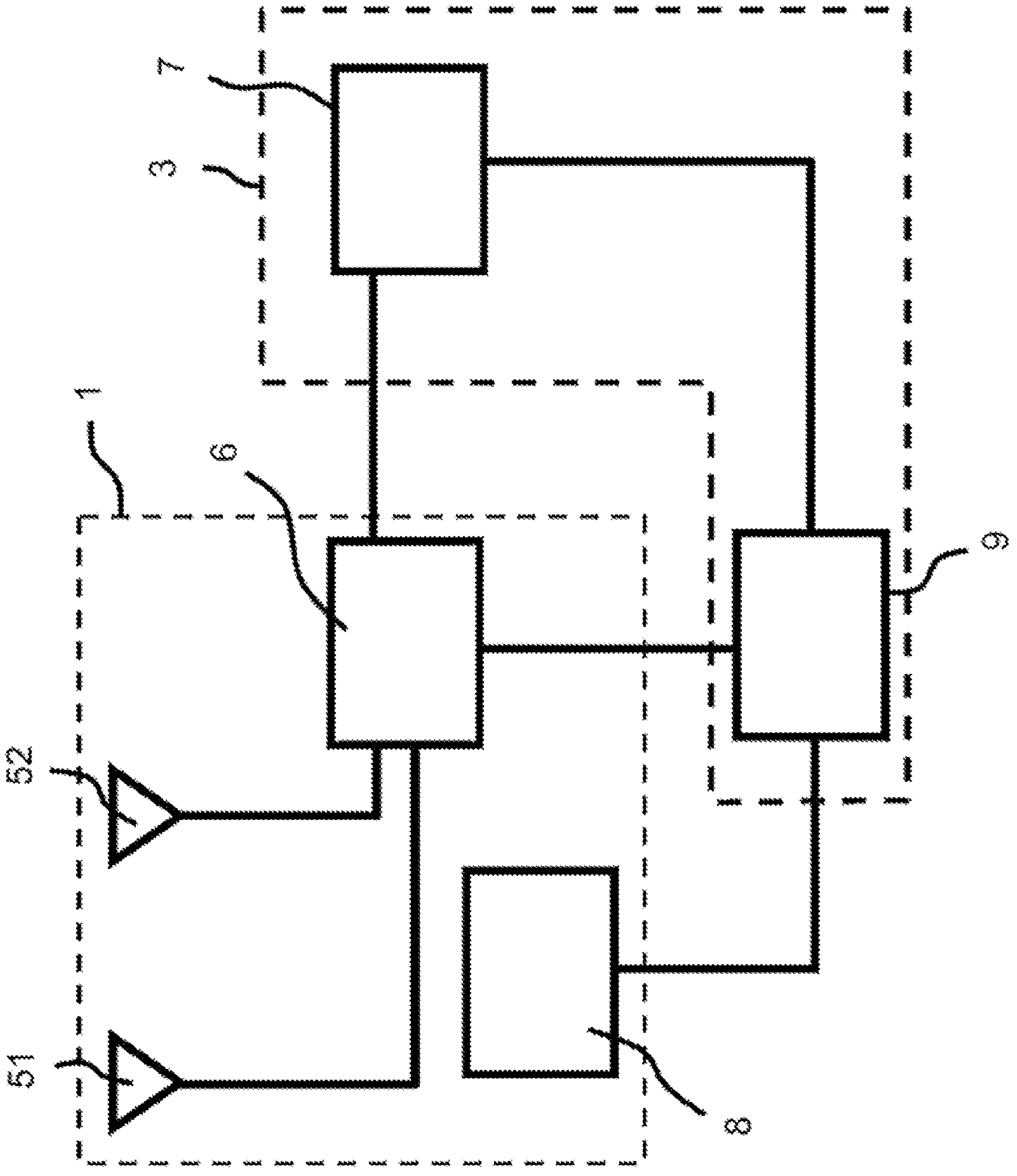
FIG. 6 is a block diagram illustrating a system structure of the mobile wireless apparatus.

FIG. 6 illustrates a system configuration of the mobile wireless apparatus. The first antenna element 51, the second antenna element 52, a rotation detecting portion 8, and the antenna switching portion 6 are accommodated in the display case 1. The wireless processing portion 7 and the control portion 9 are accommodated in the body 3. The control portion 9 includes a microprocessor and D/A converters.

The first antenna element 51 and the second antenna element 52 are connected to the antenna switching portion 6. The antenna switching portion 6 is connected to the control portion 9. The microprocessor in the control portion 9 outputs an antenna element switching signal for switching the antenna element, to the antenna switching portion 6. The antenna element switching signal is converted into an analog voltage by the Digital to Analog (D/A) converters, and then it is supplied to the antenna switching portion 6, as a control signal (control voltage) of the control portion 9. The D/A converters are each provided to a respective one of the first control voltage terminal 66 and the second control voltage terminal 67 in the antenna switching portion 6. At the selection of an antenna element, the microprocessor supplies an antenna element switching signal to the D/A converter corresponding to the antenna element to be selected.

The rotation detecting portion 8 detects a rotational state of the display case 1. For example, the rotation detecting portion 8 is formed by a magnetoresistive sensor, and detects a rotational state of the display case 1 on the basis of its relationship with a magnet provided in the second case 31 on the side of the body 3. The detected result of the rotation detecting portion 8 is sent to the microprocessor in the control portion 9. If the detected result is rolling-sideways of the display case 1, the microprocessor generates an antenna element switching signal, and performs an operation for switching to an unused antenna element for transmitting/receiving a polarized wave. The term "rolling-sideways" used herein means that the display case 1 has rotated by 90 degrees from a precedingly used position, so that the positional relationship between the first and second antenna elements has been physically interchanged with each other.

The wireless processing portion 7 receives a signal from the first antenna element 51 or the second antenna element 52, and sends a transmission signal to the first antenna element 51 or the second antenna element 52. Furthermore, the wireless processing portion 7 notifies the microprocessor in the control portion 9 of an intensity of the received signal or the value of a gain at the time when an automatic gain control was performed by an amplifier in the wireless processing portion 7 so that the output of the amplifier becomes constant. On the basis of reception states of the antenna elements, the microprocessor selects an optimum antenna element.

Figure 7:
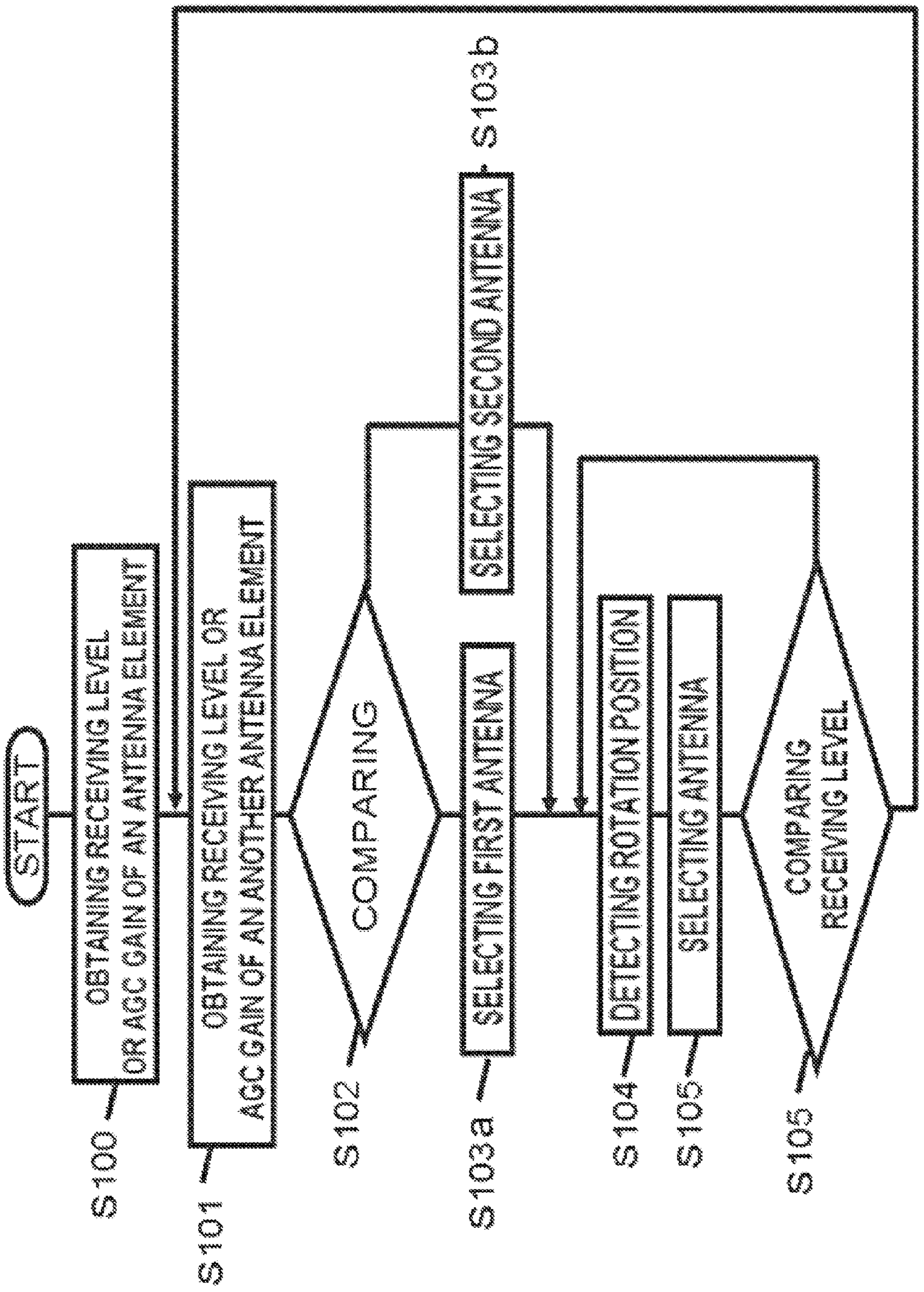
FIG. 7 is a flowchart of processes controlled by a microprocessor.

FIG. 7 is a flowchart of processes controlled by the microprocessor in the control portion 9.

On start-up of the mobile wireless apparatus, the microprocessor outputs an antenna element switching signal for selecting one of the antenna elements, to the antenna switching portion 6. The microprocessor acquires, from the wireless processing portion 7, the level of a received signal from the selected antenna element, or the value of a gain of automatic gain control (AGC) of the amplifier in the wireless processing portion 7 (S100). In FIG. 7, in this step, the first antenna element is selected. The received signal level or the value of the gain of AGC corresponds to a reception sensitivity of a radio wave, and so it may be read as a reception sensitivity.

The microprocessor outputs an antenna element switching signal for selecting the antenna element that was not selected in S100, to the antenna switching portion 6. The microprocessor acquires from the wireless processing portion 7, the level of a received signal from the newly selected antenna element, or the value of a gain of automatic gain control (AGC) of the amplifier in the wireless processing portion 7 (S101). In FIG. 7, in this step, the second antenna element is selected.

The microprocessor compares the received signal level or the gain value of automatic gain control (AGC) of the amplifier in the wireless processing portion 7 at the time when reception is performed by the first antenna element 51, with the received signal level or the gain value of automatic gain control (AGC) of the amplifier in the wireless processing portion 7 at the time when reception is performed by the second antenna element 52 (S102).

The microprocessor outputs, to the antenna switching portion 6, an antenna element switching signal such as to select the antenna element of which the received signal level was lower, or of which the AGC gain value was smaller (S103). When the received signal levels or the AGC gain values of both antenna elements are the same, the first antenna element 51 is selected.

The rotation detecting portion 8 detects that the antenna element that was selected in S103 has rotated by 90 degrees due to the rolling-sideways of the display 2 (S104).

When the 90 degree rotation of the antenna element has been detected, the microprocessor outputs, to the antenna switching portion 6, an antenna element switching signal for switching the selected antenna element to the antenna element that was not selected in S103 (S105).

If the reception sensitivity of the reselected antenna element is higher than a predetermined value, the reselected antenna element is continuously used, and the process returns to the antenna element rotation detecting step S104 (S106). Furthermore, when the reception sensitivity of the selected antenna element is higher than the predetermined value, the process returns to step S100 (S106).

That is, at system start-up of the mobile wireless apparatus, the antenna having higher reception sensitivity is selected. When the screen of the mobile wireless apparatus rolls sideways (rotates by 90 degrees), the polarization relationship of antenna between the first antenna element 51 and the second antenna element 52 is interchanged with each other. Therefore, by detecting the rolling-sideways of the screen of the mobile wireless apparatus and switching from the antenna element in use to the unused antenna element when the screen rolls sideways, it is possible to strongly receive received signals.

In the mobile wireless apparatus having the display, by switching the antenna in accordance with a rolling-sideways of the screen of the display, reception of radio waves may be performed in correspondence with the polarization of received waves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless apparatus comprising:

a display;

a display case encasing the display;

a body supporting the display case capable of rolling sideways the display;

a first antenna arranged in the display case;

a second antenna arranged in a direction substantially perpendicular to the first antenna direction in the display case;

an antenna switch configured to switch between the first antenna and the second antenna in accordance with rolling positions of the display case with the body; and a ground, having a square shape and being arranged in the display case, for grounding the first antenna and second antenna, wherein the first antenna is arranged along a circumference of the ground, and wherein the second antenna is arranged in a substantially perpendicular direction of the first antenna direction along the circumference of the ground.

2. The wireless apparatus of claim 1, further comprising:

a detector configured to detect the rolling positions of the display case with respect to the body; and a controller configured to control the antenna switch on the basis of a result of the detector.

3. A wireless apparatus comprising:

a display;

a display case encasing the display;

a body supporting the display case capable of rolling sideways the display;

a first antenna arranged in the display case;

a second antenna arranged in a direction substantially perpendicular to the first antenna direction in the display case; and an antenna switch configured to switch between the first antenna and the second antenna in accordance with rolling positions of the display case with the body, wherein the antenna switch selects one of the first antenna or the second antenna in accordance with a received signal level, and wherein the antenna switch selects the unselected one of the first antenna and the second antenna when the antenna switch detects changing the rolling position of the display case after the selecting of one of the first antenna or the second antenna in accordance with a received signal level.

4. A wireless apparatus comprising:
a display;
a display case encasing the display;
a body supporting the display case capable of rolling sideways the display;
a first antenna arranged in the display case;
a second antenna arranged in a direction substantially perpendicular to the first antenna direction in the display case; and
an antenna switch configured to switch between the first antenna and the second antenna in accordance with rolling positions of the display case with the body,
wherein the antenna switch selects one of the first antenna or the second antenna in accordance with an automatic gain control level, and
wherein the antenna switch selects the unselected one of the first antenna and the second antenna when the antenna switch detects changing the rolling position of the display case after the selecting of one of the first antenna or the second antenna in accordance with an automatic gain control level.

5. A method for choosing an antenna for a wireless apparatus including a display case with a display capable of rolling sideways with respect to a body holding the display, the method comprising:
arranging a first antenna along a circumference of a square shaped ground included in the display case;
arranging a second antenna in a direction substantially perpendicular to the first antenna along the circumference of the ground, wherein the ground grounds the first antenna and second antenna;
detecting rolling positions of the display case; and
selecting the first antenna or the second antenna on the basis of the rolling position of the display case.

6. The method of claim 5, further comprising selecting the first antenna or the second antenna on the basis of a received signal level before the selecting by the use of the rolling position of the display case.

7. The method of claim 5, further comprising selecting the first antenna or the second antenna on the basis of an automatic gain control level before the selecting by the use of the rolling position of the display case.

* * * * *